US006830222B1

United States Patent
Nock et al.

(10) Patent No.: US 6,830,222 B1
(45) Date of Patent: Dec. 14, 2004

(54) BALLOON DEVICE FOR LOWERING SPACE OBJECT ORBITS

(75) Inventors: Kerry T. Nock, Duarte, CA (US); Angus D. McRonald, La Canada, CA (US); Kim Maynard Aaron, La Crescenta, CA (US)

(73) Assignee: Global Aerospace Corporation, Altadena, CA (US)

( * ) Notice: Subject to any disclaimer, the term of this patent is extended or adjusted under 35 U.S.C. 154(b) by 0 days.

(21) Appl. No.: 10/394,477

(22) Filed: Mar. 21, 2003

Related U.S. Application Data (60) Provisional application No. 60/367,007, filed on Mar. 21, 2002.

(51) Int. Cl.[7] .................................................. B64G 1/62
(52) U.S. Cl. ................. 244/160; 244/110 D; 244/158 R
(58) Field of Search ........................ 244/158 R, 110 D, 244/160, 164

(56) References Cited

U.S. PATENT DOCUMENTS

| | | | |
|---|---|---|---|
| 3,053,476 A | | 9/1962 | Mohar |
| 3,286,951 A | * | 11/1966 | Kendall ...................... 244/162 |
| 3,508,724 A | | 4/1970 | Scher et al. |
| 3,635,425 A | * | 1/1972 | Swet .......................... 244/173 |
| 3,814,353 A | * | 6/1974 | Nelson ........................ 244/98 |
| 4,097,010 A | * | 6/1978 | Colombo et al. ........ 244/158 R |
| 4,394,998 A | | 7/1983 | Taillet et al. |
| 4,504,031 A | * | 3/1985 | Andrews .................... 244/113 |
| 4,518,137 A | | 5/1985 | Andrews |
| 4,549,464 A | | 10/1985 | Hawkins et al. |
| 4,580,747 A | | 4/1986 | Pearson |
| 4,667,907 A | | 5/1987 | Hujsak et al. |
| 4,817,895 A | | 4/1989 | Scott et al. |
| 4,824,051 A | * | 4/1989 | Engelking ............... 244/158 R |
| 4,832,288 A | | 5/1989 | Kendall et al. |
| 4,896,847 A | * | 1/1990 | Gertsch .................. 244/158 R |
| 4,903,918 A | | 2/1990 | Park et al. |
| 5,044,579 A | * | 9/1991 | Bernasconi et al. ..... 244/158 R |
| 5,082,211 A | | 1/1992 | Werka |
| 5,242,134 A | | 9/1993 | Petro |
| 5,345,238 A | * | 9/1994 | Eldridge et al. ............... 342/3 |
| 5,421,540 A | | 6/1995 | Ting |
| 5,806,801 A | | 9/1998 | Steffy et al. |
| 5,961,077 A | | 10/1999 | Koppel et al. |
| 6,119,983 A | | 9/2000 | Provitola |
| 6,264,144 B1 | | 7/2001 | Thornton |

FOREIGN PATENT DOCUMENTS

| | | | |
|---|---|---|---|
| FR | 1485587 | * 3/1966 | .............. 244/158 R |
| WO | WO 91/11676 | 8/1991 | |
| WO | WO 92/03339 | 3/1992 | |

OTHER PUBLICATIONS

Comments of Ecliptic Enterprises Corporation, Federal Communications Commission, Washington, D.C., 14 pages (esp. pp. 10–11), Jul. 17, 2002.

(List continued on next page.)

Primary Examiner—Tien Dinh
(74) Attorney, Agent, or Firm—Morrison & Foerster LLP (57) ABSTRACT

An apparatus for lowering an orbit of a space object includes an envelope, an inflation system for inflating the envelope, an inflation control system for controlling the inflation system, and attachment hardware for connecting the apparatus and the space object. Inflating the envelope increases an effective drag area of the envelope for increasing atmospheric drag on the envelope.

24 Claims, 9 Drawing Sheets

OTHER PUBLICATIONS

Minotaur, 3 pages, downloaded from www.astronautix.com/lvs/minotaur.htm, "updated: Aug. 1, 2003".

OCSE (IOSS), 1 page, downloaded from www.skyrocket.de/space.doc_sdat/ocse.htm, "last update Jan. 1, 2003".

Jason M. Andringa et al., "A System Study on How to Dispose of Fleets of Small Satellites." MIT Space Systems Laboratory, Feb. 2001, pp. 1–125 (esp. 93–113).

NASA, "Guidelines and Assessment Procedures for Limiting Orbital Debris" NSS 1740.14., Aug. 1995, pp. iii–iv, 1–1–8–6, Appendix A, A–1, A–2; Appendix B, B–1–B4.

F. Bloetscher, "Aerodynamic deployable decelerator performance evaluation program, phase II", Goodyear Aerospace Corp., Air force Flight dynamics Laboratory, AFDL–TR–6725, Jun. 1967, pp. ii–xviii, 1–14.

R. Baker, Jr., Astrodynamics, "Applications and Advanced Topics", Academic Press, N. Y. and London, 1967, pp. 156–161.

R. W. Barbieri et al., "Atmosphere Explorer (AE–C) Adaptive Mission Design and Trajectory Performance", AAS/AIAA Astrodynamics Specialist Conference, Jul. 28–30, 1975, pp. 1–13.

R. D. Braun et al., "Predictor–Corrector Guidance Algorithm for Use in High–Energy Aerobraking System Studies", J. of Guidance Control and Dynamics, vol. 15, No. 3, May–Jun. 1992, pp. 672–678.

Cassapakis, C., and Thomas, M., "Inflatable structures technology development overview," AIAA 1995 Space Programs and Technologies Conference, Paper AIAA 95–3738, pp. 14–23.

Clemmons, Jr., "The Echo I Inflation System", LaRC, NASA TN D–2194, Jun. 1964, pp. i, 1–53.

M. A. Dornheim, "Inflatable Structures Taking to Flight," Aviation Week & Space Tech. vol. 150, No. 4, p. 60, Jan. 25, 1999, 5 pgs., consecutively.

R. E. Freeland et al., "Inflatable Deployable Space Structures Technology Summary", by the Inter. Astronautical Federation, 1998, pp. 1–16.

R. E. Freeland et al., "Development of Flight Hardware for a Large Inflatable–Deployable Antenna Experiment", NASA 1996, pp. 24–33.

R. E. Freeland et al., "Significance of the Inflatable Antenna Technology", NASA 1996, pp. 38–43.

R. L. Forward et al., "Application of the Terminator Tether™ Electrodynamic Drag Technology to the Deorbit of Constellation Spacecraft", Published by the American Institute of Aeronautics and Astronautics, Inc. 1998, pp. 1–19.

P. Gloyer et al., "Small Payload ORbit Transfer (SPORT™) System: An Innovative Approach to Lowering Missions Costs Without Increased Risk", 14th Annual/USU Conference on Small Satellites, 2001, 8 pgs.

P. Gloyer et al., "Aerobraking to Lower Apogee in Earth Orbit with the Small Payload ORbit Transfer (SPORT™) Microsatellite Vehicle", Paper #SSCO1–X1–8, presented at the 15th Annual USU Conf. on Small Satellites, 2001, pp. 1–7.

J. Hall et al., "Aerocapture Trajectories for Spacecraft with Large, Towed Ballutes", Paper # AAS 01–235, AAS/AIAA Space Flight Mechanics Meeting, Santa Barbara, CA, Feb. 2001, titlepage, pp. 1–16.

J. Hall, "A Review of Ballute Technology for Planetary Aerocapture", Jet Propulsion Lab. Ca Inst. of Tech., $4^{th}$ IAA International Conference on Low–Cost Planetary Missions, May 2–5, 2000, The John Hopkins University, Maryland, pp. 1–10.

Corso, C. J. and C. L. Eyer, "Space Tug Aerobraking Study," The Boeing Company report D5–17142 (NASA Accession No. N7224915), Apr. 12, 1972, 44 pgs.

"Orbital Transfer Vehicle Concept Definition and Systems Analysis Study," Martin Marietta Denver Aerospace NASA/MSFC Contract NAS8–36108, Feb. 1986, pp. 1–44.

D. J. Kessler, "Orbital Debris Environment in Low Earth Orbit: An Update", Adv. Space Res. vol. 13, No. 8, 1993, pp. (8)139–(8)148.

D. R. Lide, Ph.D, CRC Handbook of Chemistry and Physics, CRC Press, Inc. 71 st. ed. 1990–1991, 7 pgs. (pp. Cover, 14–11 thru 14–17).

D. Lyons, "Aerobraking at Venus and Mars: A Comparison of the Magellan and Mars Global Surveyor Aerobraking Phases", AIAA/AAS Astrodynamics Specialist Conference, Girdwood, Alaska, Aug. 16–19, 1999, AAS 99–358, pp. 859–877.

A. McRonald, "Use of Atmospheric Drag to Circularize an Elliptic Spacecraft Orbit at Venus", Jet Propulsion lab. CA, Mar. 1, 1977, Sec. I, 1–1–1–3; Sec. II, 2–1; Sec. III, 3–1; Sec. IV, 4–1, 4–2; Sec. V, 5–1–5–3; Sec. VI, 6–1, 6–2; Sec. VII, 7–1; Sec. VIII, 8–1, 8–2; Sec. IX, 9–1; Sec. X, 10–1, 10–2; Sec. XI, 11–1, 11–2; Sec. XII, 12–1–12–3; Sec. XIII, 13–1, 13–2; Sec. XIV, 14–1, 14–2; Sec. XV, 15–1, 15–2; 16–1, 16–2; 17–1–17–17; 18–1–18–4.

A. McRonald et al., "Atmospheric Braking to Circularize an Elliptical Venus Orbit", AAS/AIAA Astrodynamics Conference Jackson, Wyoming, Sep. 7–9, 1977, 31 pgs. (8 pgs. text; 23 pgs figures).

K. W. Meyer et al., "Atmospheric Reentry Disposal for Leo Spacecraft", Am. Inst. of Aeronautics and Astronautics, Inc., 1998, pp. 242–253.

Lauri Kraft Newman and David C. Folta, "Evaluation of Spacecraft End–of–Life Disposal to Meet NASA Management Instruction (NMI) Guidelines," AAS 95–325 AAS/AIAA Astrodynamics Specialist Conference, Halifax, Nova Scotia, Aug. 14–18, 1995, pp. 407–426.

F. J. Regan et al., "Dynamics of Atmospheric Re–Entry", published by Am. Inst. of Aeronautics and Astronautics, Inc., Feb. 1, 1993, pp. 21–31, 36–37.

R. Smith et al., "Mars precision landing: an integrated estimation, guidance and control simulation", Center for Control engineering and Computation (CCEC) report 98–0918, Univ. of Ca, Santa Barbara, 1998 pp. 1–52.

M. A. Taverna, "Flight Analysis Shows Feasibility of Inflatable Reentry System", Aviation Week & Space Tech. Feb. 28, 2000, p. 44.

Ch. Uphoff et al., "The Space Anchor: a Tethered Drag Device to Enhance Orbit Capture", AAS/AIAA Space Flight Mechanics Meeting Clearwater, Fl. Jan. 23–26, 2000, pp. 1–24.

G. D. Walberg, "A Survey of Aeroassisted Orbit Transfer", J. Spacecraft, vol. 22, No. 1, Jan.–Feb. 1985, pp. 3–18.

A. Wilson, "A History of Balloon Satellites", J. of the British Interplanetary Society, V34, Jan. 1981, p. 10–22.

Aerospace Recovery Systems, Klassic Concepts Consulting, 1997, downloaded from members.aol.com/sanjuana/2aKC-CARSIHOMEPAGE.html, pp. 1–3.

R. A. DiPilla, "Buoyant Planetary Entry" Thesis, Air Force Institute of Technology, 1966, Cover., ii, ix–xii; pp. 45, 89–90, 92, 97, 101–106.

K. Uesugi, "Results of the MUSES–A 'HITEN' mission," Advances in Space Research, 1996, vol. 18, No. 11, pp 69–72.

LESDOS, Inflatable Space Structures, "Echo", NASA Facts on Line, Apr. 9, 2000, 1 pg.

LESDOS, "NASA's Gleaming Satellite Adapted as Economic Giant" NASA Facts on Line, Oct. 1993, pp. 1–2.

LESDOS, Inflatable Space Structures, "Echo 1, 1A, 2", NASA Facts on Line, downloaded Jul. 10, 2000, 2 pgs.

A History of Innovation, Investor Relations, downloaded www.sheldahl.com/Invest/ProfileHistory, Jul. 12, 2000, 2 pgs.

NASA, NASA Experimental Communications Satellites, "Echo", downloaded sulu.lerc.nasa.gov/dglover/echo.html, Jun. 19, 1998, 1 pg.

* cited by examiner

BALLOON DEVICE FOR LOWERING SPACE OBJECT ORBITS

CROSS-REFERENCE TO RELATED APPLICATIONS

This application claims the benefit of provisional application 60/367,007, filed Mar. 21, 2002, which is incorporated hereby in its entirety by reference.

BACKGROUND OF THE INVENTION

1. Field of Invention

The present invention relates generally to space objects (including spacecraft, space vehicles, space satellites and space debris) and more particularly to a method and apparatus for lowering the orbit of a space object with respect to the Earth or some other celestial body.

2. Description of Related Art

Earth Orbital Debris Problem

The Earth has a mature and growing orbit debris and satellite problem. As of September 2001 the US Space Command tracks more than 2741 payloads and 6092 debris objects (greater than 10 cm in size) [MSFC Space Environmental and Effects Program (SEE) http://see.msfc.nasa.gov/]. It is estimated that there are more than 100,000 objects with size in the range 1.5 to 10 cm. All these objects are subjected to further impacts of other debris particles that can cause a cascade of debris once a critical mass of material is in an orbit. Occasional impacts of satellites create many fragments and particles. In addition, all these objects are affected by atomic oxygen erosion, which can cause paint to erode from surfaces increasing the debris environment.

In lieu of a national policy, the National Aeronautics and Space Administration (NASA) has established guidelines ["Guidelines and Assessment Procedures for Limiting Orbital Debris"] for mitigation of orbital debris that include limitations on released objects during normal operations, constraints on the probability of debris-causing explosions and collisions, control requirements on reentry location, and post-mission disposal. Post-mission disposal, practically speaking, calls for de-orbit of satellites at the end of their useful life.

The implication of planned de-orbit has been the carrying of additional propulsion system propellants in order to execute these de-orbit maneuvers at the end of mission. Some satellites have sufficient propulsion capability to lower their orbits or entirely de-orbit at end of life, but this requires additional mass. Unfortunately, the propulsive method of de-orbit requires additional mass be carried at launch that otherwise could have been used for mission equipment, and it also requires a cooperative satellite, that is, one that can receive and act on ground commands or execute long stored sequences. Failures of computers, power systems, or other key systems can make propulsive maneuvers impossible. Unfortunately, Earth orbit space vehicles that cannot afford the propulsive mass have no de-orbit provision whatsoever (e.g. Orbcomm satellites).

Reducing the debris problem is very important to the future use of LEO (low-earth orbit). It is now recognized that the debris problem can be mitigated by the elimination of debris-causing operations and by the removal of objects from orbit after they have achieved their useful life (e.g., old space stations, derelict satellites and used launcher stages).

Space Vehicles And Atmospheric Drag

Natural atmospheric drag operates by the exchange of momentum between the space vehicle and the molecules of the atmosphere. At high altitudes, where the atmosphere exhibits free molecular flow (where a molecule travels further than a characteristic length without colliding with another molecule), the space vehicle impacts molecules of air which either bounce off or stick to the space vehicle. If the molecule sticks, it imparts a momentum change to the space vehicle equal to the molecule's mass times the relative velocity of the molecule. On the other hand if a molecule bounces off the space vehicle, it imparts up to twice the momentum change. At lower altitudes, both drag and lift forces can be used to change the momentum of the space vehicle.

Space vehicles use entry capsules, heat shields or aeroshells, made of ablative materials or of materials that can withstand high temperature, to protect internal elements from the heating caused by atmospheric drag when reentering the atmosphere. Entry capsules, employed since the late 1950s, use atmospheric drag in order to slow space vehicles in the upper reaches of planetary atmospheres so they can descend to the surface of a planet. Also, concepts exist for ballutes (a word formed by a combination of balloon and parachute), which are robust, high-temperature-capable, inflated envelopes, for increasing the area of a space vehicle to reduce its velocity at a higher than usual altitude as compared to an aeroshell.

Entry Capsules

Entry capsules were used in the re-entry of the Mercury, Gemini and Apollo vehicles, and for planetary entry of the Viking Mars landers, the Pioneer Venus probes, the Galileo Jupiter probe and the Mars Pathfinder lander. These devices can be designed to change the natural entry trajectory of a space vehicle within the atmosphere to target the space vehicle to a particular landing zone as in the case of ballistic missile re-entry vehicles or Mars landing systems [Roy Smith, David Bayard and Ken Mease, "Mars precision landing: an integrated estimation, guidance and control simulation," Center for Control Engineering and Computation (CCEC) report 98-0918, University of California, Santa Barbara, 1998]. Entry capsules primarily operate in the planetary Thermiospheres (lower levels) and Mesospheres. Entry capsules require massive thermal protection systems to protect the vehicle from the effects of atmospheric entry heating. The entry capsule mass can often be as much as 25% or more of the mass of the space vehicle itself. Extending the sizes of entry capsules to reduce the ballistic coefficient by one or more orders of magnitude is impractical due to the tremendous mass increase required. Furthermore, entry capsules are not amenable to low-volume stowage and use on uncontrolled space debris.

Aerocapture

Changing a planet-relative orbit from a very high-energy elliptical or a hyperbolic flyby orbit to a low energy elliptical or near circular orbit by means of a single pass to the mesospheric zone of an atmosphere is called aerocapture. Aerocapture has been analyzed extensively in recent years for use in orbit capture in order to reduce propulsion requirements. Aerocapture can be used by space vehicles to go into orbit around distant planets or it can be used at Earth to change the orbit of spent launch vehicle upper stages in order to place them into lower altitude, near circular orbits. Aerocapture systems use thermal protective surfaces oriented toward the atmospheric flow, or ram direction, to quickly decelerate a spacecraft (with a single deep atmospheric pass) from high velocity to orbital velocity. As with entry capsules, aerocapture requires the use of relatively massive aeroshells to protect their enclosed space vehicle from damage by atmospheric heating.

Aerobraking

Aerobraking is the use of atmospheric drag forces during repeated periapsis passes through the very high altitude, lower thermospheric zone of the atmosphere to take energy from an orbit as in circularizing an elliptical orbit. Aerobraking can be performed with unprotected space vehicles provided the altitude of the aerobraking process is high enough, where atmospheric densities are low, to reduce severe heating which could damage a space vehicle. When used, aerobrake devices are relatively large surfaces that can be deployed to increase the number of molecule collisions in order to increase the drag force and accelerate the process of reducing orbit energy. Aerobrakes can also function as protective surfaces to isolate the space vehicle from atmospheric heating during the periapsis passes in the atmosphere. If the cross-section area of a spacecraft can be increased, the aerobraking effect will be effective at higher altitudes, reducing heating of spacecraft surfaces, allowing the series of maneuvers to be completed more quickly and more safely.

Where aerobrake structures have been considered to protect the spacecraft and to provide additional drag, they are typically made of rigid structures with thermal protection materials or lightweight metal films stretched between rigid structural members [Gloyer, P., et al, "Aerobraking to Lower Apogee in Earth Orbit with the Small Payload Orbit Transfer (SPORT™) Microsatellite Vehicle, " Paper #SSC01-XI-8, presented at the 15$^{th}$ Annual USU Conference on Small Satellites, 2001]. As lightweight as they can be, they are still heavy as compared to an ultra-thin envelope.

Ballutes

The objective of ballute device concepts is to reduce the velocity of a space vehicle quickly in the upper reaches of a planetary atmosphere (lower Thermosphere and Mesosphere). There are two distinct types of ballute concepts, namely heavy and light. Both device concepts may be deployed prior to entry of a space vehicle, and both types can be mounted to the space vehicle directly or attached to it via a tether. Heavy ballute concepts are very robust and made to withstand high levels of aerodynamic heating and force [W. Arnold and F. Bloetscher, "Aerodynamic deployable decelerator performance evaluation program, phase II," Goodyear Aerospace Corp., Air Force Flight Dynamics Laboratory, AFDL-TR-6725, 1966]. Concepts for heavy ballutes have them made of heavy heat resistant materials that can operate at high levels of heating and aerodynamic force. Heavy ballutes can be deployed late in an entry trajectory after the peak of aerodynamic heating and deceleration. The ratio of ballistic coefficient of a vehicle with and without a heavy ballute is usually a factor of 2 to 3.

Concepts for light ballutes, though still robust, operate in the Thermosphere at lower levels of aerodynamic heating and force [Hall, J. L. and Andrew K. Le, "Aerocapture Trajectories for Spacecraft with Large, Towed Ballutes, " Paper # AAS 01-235, AAS/AIAA Space Flight Mechanics Meeting, Santa Barbara, CA February 2001]. Conceptually, light ballutes are made large enough to reduce the aerodynamic heating to a level that can be radiated by the ballute at an acceptable temperature. Light ballutes alter the entry trajectory, reducing the velocity at low atmospheric density levels. Though light ballutes have also been proposed as simple multi-pass aerobraking devices, they are not capable of withstanding the long-term effects of the space environment and the increasing stagnation pressure with orbit decay. Conceptually, light ballutes are made of a thin film material capable of use as a low-pressure pressure balloon and moderate temperatures on the order of 500° C., enclosed in a net of load-bearing tapes of a material capable of a comparable temperature and strength. The ratio of ballistic coefficient of a vehicle with and without a light ballute concept is usually a factor of 50 to 150. Overall, ballutes operate at relatively high temperatures (several hundred degrees rise from ambient) and withstand g-forces several times Earth gravity, thus are relatively thick and heavy requiring 15 to 30% of the total mass of the aerocapture spacecraft.

Space Inflatables

Space inflatable systems have been flown in Earth orbit including the Echo-class balloons, a NASA inflatable antenna flight demonstration, and numerous ballistic missile entry vehicle decoy experiments and demonstrations. Typically, these systems are substantially affected by atmospheric drag.

Balloon Satellites

The NASA Echo I balloon was designed for microwave communications relay experiments. After a number of attempts with various space balloon systems, the Echo I balloon was launched successfully on Aug. 12, 1960 from Wallops Island into an 800-mile altitude orbit. Echo I was a 100-ft diameter Aluminized Mylar spherical envelope that weighed 68 kg including inflation system (Clemmons, Jr., D. L., "The Echo I Inflation System", LaRC, NASA TN D-2194, June 1964 and Wilson, A., A History of Balloon Satellites, Journal of the British Interplanetary Society, V34, p. 10–22, January 1981). Inflation compounds included benzoic acid and anthraquinone, a subliming powder. The Echo I envelope was aluminized (2000-Angstrom layer) to provide a reflective surface for microwave communications relay experiments. This was fortunate for the Echo I experiment because without the metallization, it would have disintegrated within months due to the, then unknown, combined atomic oxygen and UV environment. At the time Echo I flew, the orbital debris environment was nil; most of the holing would have been due to meteoroids. Echo I survived until May 24, 1968 when it finally achieved de-orbit and burned up in the atmosphere.

Inflatable-Deployable Space Structures

Large inflatable-deployable space structures are being considered for a variety of different space applications. NASA has conducted an inflatable antenna experiment, which was deployed from the Space Shuttle in 1996 (R. E. Freeland, et al., "Development of Flight Hardware for a Large Inflatable-Deployable Antenna Experiment", and R. E. Freeland, et al., "Significance of the Inflatable Antenna Technology"). In some cases heavy envelopes are used that contain self-rigidization materials that are not practical for very large-area inflated envelopes. Furthermore these devices are not deployed to de-orbit other space objects. Indeed, for these space structures it is desirable to achieve as long an orbital life as possible. Space inflatables have no provision for inflation gas maintenance and thus, without some method of rigidization of the envelope, spherical shapes degrade into wrinkled ellipsoids as the long duration effects of meteoroids and space debris penetrate the envelopes and produced leakage holes.

Ballistic Missile Decoys

Another example of a space inflatable device is a decoy for simulation of ballistic missile re-entry. These ballistic missile decoys simulate the size, shape, optical and radar reflections, of missiles, as well as features such as spin, coning, and surface temperature. A number of flight tests have been performed in the past and recently (Cassapakis, C. and M. Thomas, "Inflatable Structures Technology Development Overview", AIAA 95-3738). These space inflatables have no provision for inflation gas maintenance since they are used for only a short duration during sub-orbital flight. In addition, ballistic missile decoy envelopes are relatively heavy due to their simulation requirements. Finally, ballistic missile decoys have no requirement for large cross-section area since their ballistic coefficient is driven by the ballistic missile they are designed to simulate.

Additional Orbit-Lowering Applications

The efficient lowering of space objects from orbit using natural atmospheric drag effects has several applications including the safe removal from orbit, or de-orbit, of large heavy space structures, the efficient de-orbit of spent satellites and orbit debris, the removal of spent upper launch vehicle stages from orbit, the performance enhancement of launch vehicle, and the aero-assisted orbit lowering or aerocapture of planetary satellites.

De-orbit of Large Space Structures

There are several satellites of significant size that represent a future threat to people or property on the ground. Under some operational scenarios, it would be desirable to quickly bring such an object to a low altitude where only a very small delta-V (change in velocity, usually using propellant and a nozzle) is necessary to target re-entry to an unpopulated zone. The natural but accelerated de-orbit of a large derelict space station or orbiting space observatories has been examined. The now reentered Russian space station Mir is a good example of the size of an object that could represent a danger. Such an object first needs to be lowered in altitude to so that a small delta-V will precisely target it to a safe re-entry. For a Mir-sized object at 380-km altitude, orbit lowering would require about 3,000 kg of rocket propellant due to the delta-V required and the large mass of the object to be slowed. At the current cost of launching mass into LEO ($10,000 to 20,000 per kg), this propellant would cost 30–60 million dollars to deliver to orbit. If the mass of a device for orbit lowering were significantly smaller than the mass of rocket fuel for this initial orbit lowering process, it could potentially offer considerable savings.

De-orbit of Spent Satellites and Orbit Debris

The majority of space objects that have de-orbited have done so naturally. Most objects in LEO, satellites and orbital debris, will de-orbit in a period from a few weeks to many years, and most burn up in the atmosphere, so that relatively few space vehicles have been observed and reported as falling to Earth, though even this is a growing concern. Atmospheric drag is particularly effective in de-orbiting low altitude satellites especially in periods of high solar activity when the atmospheric density rises at orbit altitudes. In periods of low solar activity or for higher altitude space vehicles, the natural decay process can take many years, during which time the space vehicle is exposed to orbital debris.

Space Station Trash Removal.

A system for space station trash removal was described in U. S. Pat. No. 5,242,134. As illustrated in FIG. 1 of that patent, a bag member (for storing trash) is attached to compacted balloon element which has enough air left in the interior to inflate the balloon in space and yet permit folding in a compacted condition. The balloon is initially maintained in the compacted condition by retaining means which are released when the bag and balloon are ejected into space. (col. 4, lines 14–42.) Then, for example, when the bag is full, an astronaut in a pressure suit takes the bag to an airlock where the retaining means can be released and the unit is thrown into space. (col. 5, lines 7–20.) Once in a vacuum, the balloon inflates. Due to a large cross-sectional area of the balloon relative to its mass, the combined balloon and bag are slowed by atmospheric drag to a much greater extent than the space station. The balloon and bag lose altitude and reenter the atmosphere, whereby the elements and contents are destroyed by aerodynamic heating. (col. 3, line 65 to col. 4 line 4.) As an alternative to inflation due to air in the folds of the balloon, a subliming agent may be used. (col. 3, lines 57–58.)

This systems lacks a subsystem for controlled inflation and pressure maintenance. Relying on inflation from entrapped gases or a subliming agent may create obstacles to implementation including the availability of airlock, the substantial forces that can result when the balloon is exposed to a vacuum, and pressure loss after deployment due to holing.

Launch Vehicle Removal and Performance Enhancement

Many launch vehicles need to jettison spent rockets and propellant tanks prior to reaching final orbit. Sometimes performance optimization dictates that these stages be placed into independent orbits, especially launches to geosynchronous transfer orbit (GTO). Today some launchers require these stages to carry reserve fuels in order to enable de-orbit, thus preventing them from contributing to the orbital debris problem. Performance of these launchers could be improved if a low-mass device were used instead to de-orbit the stage. Such a device provides options for extending performance of expendable and Space Shuttle launch vehicles by enabling low-cost orbit lowering of stages and external tanks from which propulsive, targeted de-orbit can be achieved thus assisting in space object removal before they can become targets for orbit debris impact.

Conclusion

Thus, there is a need for improved methods and devices for lowering orbits of space objects through atmospheric drag.

SUMMARY OF THE INVENTION

In one embodiment of the present invention, an apparatus for lowering an orbit of a space object includes an envelope, an inflation system for inflating the envelope, an inflation control system for controlling the inflation system, and attachment hardware for connecting the apparatus and the space object. Inflating the envelope increases an effective drag area of the envelope for increasing atmospheric drag on the envelope.

Additionally the apparatus may include spatial separation element such as a mast or a tether for providing a spatial separation between the envelope and the space object. Alternatively a spatial deployment-deployment system together with a corresponding control system may be employed for creating a spatial separation between the envelope and the space object. A reefing sleeve may enclose a portion of the envelope so that the envelope is protected before the envelope is inflated and the reefing sleeve is separated from the envelope when the envelope is inflated.

Embodiments of the present invention include corresponding methods. In this way the present invention provides improved apparatuses and methods for lowering the orbits of space objects through atmospheric drag.

BRIEF DESCRIPTION OF THE DRAWINGS

FIGS. 8 A-D show an inflation sequence for the embodiment of FIG. 6 where the drag envelope is restrained by the reefing sleeve as an inflation bubble grows.

DETAILED DESCRIPTION OF EXEMPLARY EMBODIMENTS

Figure 1:
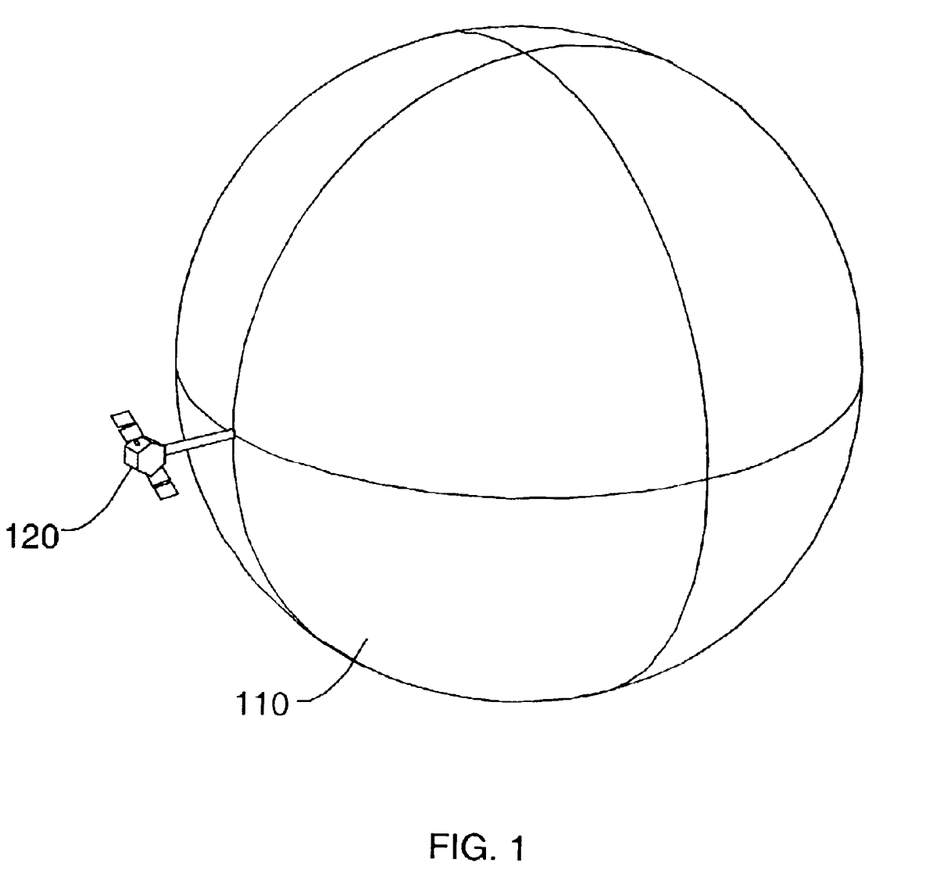
FIG. 1 shows in perspective an orbit-lowering device attached to a space object according to an embodiment of the present invention.
Figure 2:
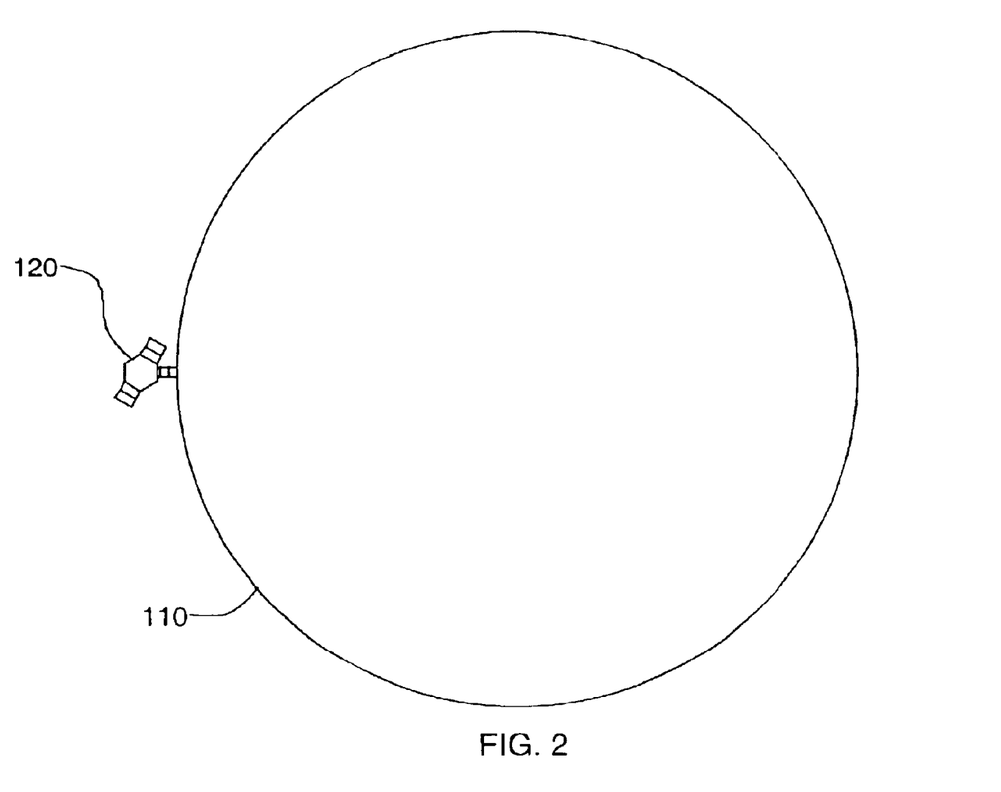
FIG. 2 shows in side view the orbit-lowering device attached to a space object according to the embodiment of FIG. 1.
Figure 3:
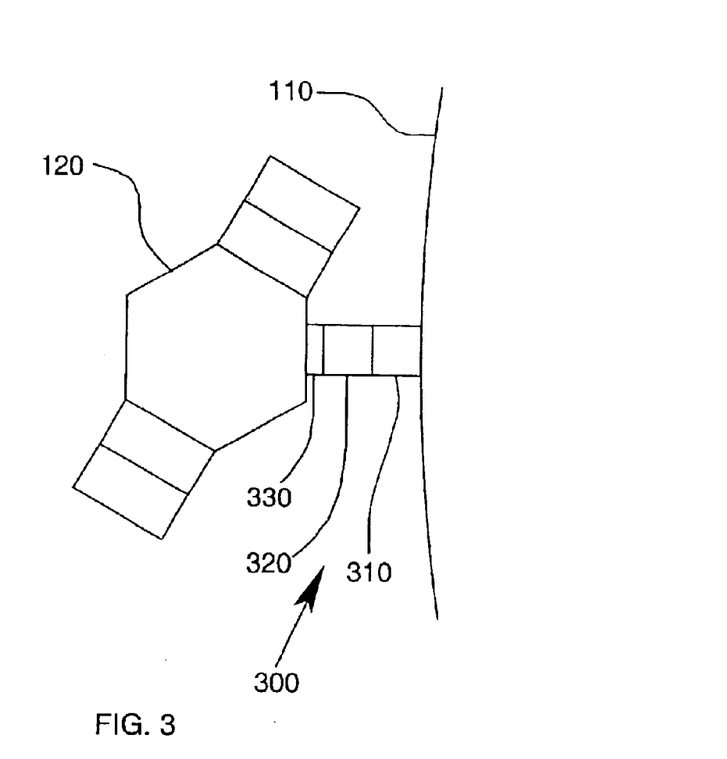
FIG. 3 shows a closer view of the region of attachment between the orbit-lowering device and the space object according to the embodiment of FIG. 1.

An embodiment of the present invention is shown in FIGS. 1–3. FIG. 1 shows in perspective a fully inflated drag envelope 110 of an orbit-lowering device attached to a space object 120. The space object 120 is shown as a space satellite (with solar panels), but other options include a spacecraft, a space vehicle, a space satellite or a piece of space debris. The drag envelope 110 is shown as a sphere, but the shape could be significantly different. FIG. 2 shows the same system in side view. As shown in FIG. 3, the orbit-lowering device 300 includes the envelope 110, an inflation system 310, a control system 320, and attachment hardware 330.

The drag envelope 110 is preferably fabricated of lightweight but strong thin materials similar to those used for high altitude balloons. For example, the drag envelope 110 can be made of an ultra-lightweight thin film protected against both the atomic oxygen and ultra-violet light environments by a thin coating of metal, oxide, ceramic or some other protective material. There are many choices of material including polyethylene, or nylon, or PTFE (polytetrafluoroethylene). It may also be made of thin sheets of metal. The envelope may be made of several layers of thin materials to meet different needs. For instance, the outer surface may be coated with a thin layer of metal to resist degradation from ultraviolet or visible light, and to resist breakdown by atomic oxygen. The inflated drag envelope 110 provides substantial increase in overall space object cross-section area exposed to the incoming flow of atmospheric molecules caused by the space object's orbit velocity. The envelope 110 can be a spherical, ellipsoidal, toroidal, or other convenient shape to provide the desired cross-section area. The envelope can also be made up of a multiplicity of separate inflated envelopes that together provide the desired cross-section area.

The inflation system 310 typically includes some combination of a pressurized gas source, a pressure regulator, a pressure sensor, valves, and tubing to carry the gas from the gas source to the drag envelope 110. In general, there are several approaches that could be used to inflate the drag envelope 110. One could store inflation gas as a compressed gas in pressurized tanks, or in the liquid or solid form, or in chemical form. Some materials have low vapor pressure in the solid or liquid form, and could be converted to gas when needed by the addition of heat, perhaps by solar illumination. Some gases could be stored as cryogenic liquids until needed. This may require a means of keeping the temperature sufficiently low to maintain the gas as a liquid. Gases may also be stored in chemical form. Many chemical reactions release copious quantities of gases, which could be used to inflate the drag envelope 110. Any of these methods of storing gas would suffice for the use of the orbit-lowering device 300.

The control system 320 includes an inflation control system for controlling the inflation system in one or more modes of operation. For example, in an inflation mode the inflation system 310 inflates the envelope 110. Additional modes may include a deflation mode for deflating the envelope and a pressure-maintenance mode for maintaining pressure in the envelope.

Depending on the operational conditions, it may be advantageous to provide more substantial control of the pressure inside the drag envelope 110. As inflation gas leaks out of small holes in the drag envelope 110 caused by the inevitable collisions with orbital debris and micrometeoroids (e.g., holing), a valve could be opened to inject replenishment gas to maintain the inflation pressure at a desired level. As the orbit-lowering device 300 reduces the orbital altitude of the space object 120, there will be an increase in the dynamic pressure due to moving at high speed through the higher-density atmospheric gas. If the internal inflation pressure is allowed to fall much below the external dynamic pressure, then the drag envelope 110 will begin to lose its shape. This may reduce the effectiveness of the orbit-lowering device 300 as the projected drag area will probably decrease. On the other hand, this may be beneficial in that it may reduce stress on the drag envelope material. In some cases, it will be desired to maintain the inflation pressure above the dynamic pressure. In other cases, it may be preferred to control the inflation pressure to a lower value.

When the inflation pressure is higher, a greater mass of inflation gas will leak out of the same size holes in any given period of time as compared with a lower inflation pressure. Simply maintaining a high inflation pressure will therefore require a greater mass of replenishment gas. For short duration periods of operation of the orbit-lowering device, this may not be a concern. For the situation in which it is expected to take a long duration to achieve the desired orbit lowering, then it may be desired to use the lowest pressure possible at each stage of the orbit-lowering process to minimize the total mass of replenishment gas needed. Provided the internal inflation pressure is about equal to, or a little higher than the dynamic pressure, the drag envelope 110 will tend to maintain its fully inflated shape. If the inflation pressure falls much below the dynamic pressure, then the drag envelope 110 will begin to deform under the action of the greater effective pressure acting on the front surface as compared with the inflation pressure inside the drag envelope 110.

The dynamic pressure can vary by many orders of magnitude over the range of altitudes covered by feasible orbit-lowering using atmospheric drag. The dynamic pressures may cover the range of $10^{-10}$ to $10^{-2}$ torr. It is possible to measure pressures over this range by using existing vacuum gages, such as ionization gages. Such gages could be used as part of an inflation pressure control system that is included in the control system 320.

The control system 320 may be further expanded according to the given operational requirements, including the type of space object 120 to which the orbit-lowering device 300 is attached.

If the orbit-lowering device 300 is attached to a space object 120 that is already in orbit and which has no further useful operational life, such as a derelict spacecraft, and if the attachment process is automatic, then it is likely that the orbit-lowering device 300 could be initiated immediately after attachment. If the attachment process involves humans in the vicinity, then at least a predictable delay would be necessary. There may be other reasons to delay deployment. For instance, it may be desirable to operate the orbit-lowering device 300 at a specific point in the orbit to help achieve a specific atmospheric entry point if the intent is to de-orbit the space object 120 completely. In these cases, a simple delay timer may be sufficient to trigger deployment of the drag envelope. Another option is to use a remote command, perhaps by radio, or laser, or other communications channel to send a signal to initiate deployment.

For some modes of operation, the control system 320 might include control logic for a watchdog timer. The watchdog timer would be reset regularly by a normally operating space object 120. If the space object 120 is damaged, or becomes inoperative for any reason, the watchdog timer will not be reset. When the watchdog timer reaches some predefined value, then the orbit-lowering device 300 will deploy automatically and de-orbit the now derelict space object 120. This approach allows the orbit-lowering device 300 to operate even when the space object 120 is inoperative.

In some cases, it may be desirable to select a specific atmospheric entry point, perhaps as a way of reducing threat to people or property on the surface of the earth. In this case, it may be desirable to be able to control the inflated area rather than simply inflating the envelope to full capacity. The envelope 110 of the orbit-lowering device 300 could be filled for a period of time to reduce the orbit to some critical altitude, and then the envelope 110 could be deflated by releasing the inflation gas. At a later time, the envelope could then be re-inflated to select a specific atmospheric entry point. Naturally, such sophisticated operation of the orbit-lowering device 300 would require a more sophisticated control system 320, perhaps with remote commanding, although it is also possible to have fully automatic control. Instead of complete deflation, partial deflation may be used to reduce the drag area to control the rate of orbit lowering, especially in the critical final phase in which the rate of orbit decay would typically be greatest.

In some situations in which the orientation of a space object 120 has been disturbed and knowledge about the exact orientation has been lost, deployment of an orbit-lowering device 300 could be used to reestablish an orientation with respect to the direction of the flight path. Assuming that the space object 300 is then able to continue normal operations, the orbit-lowering device 300 would be released. Further assuming that one desired to retain at least one orbit-lowering device 300 for final de-orbit of the space object 120, this would suggest that several orbit-lowering devices would be attached to the space object 120.

The attachment hardware 330 can include a variety of elements for providing an attachment to the space object 120. A rigid system of attachment hardware 330 could include brackets, clamps, bolts, and screws. A non-rigid system could include a combination of tethers or elastic elements. A complementary attachment hardware element may be attached to the space object 120 to facilitate the attachment process (e.g., a snap connection). The orbit-lowering device 300 can be attached to the space object 120 prior to insertion into operation in orbit around a planet, moon, or other celestial body with sufficient atmosphere for operation of the orbit-lowering device. Alternatively, given that many objects are already in orbit around the earth, it is possible to attach an orbit-lowering device to space objects in orbit. There are many possible methods of attaching the orbit-lowering device to objects in orbit, such as magnetic, mechanical grappling, adhesive, welding, mechanical penetration, etc.

After attachment to a space object 120, the orbit-lowering device 300 is used to increase the effective drag area, or projected area facing the relative motion of the space object with respect to the atmosphere. This increases the aerodynamic drag that opposes the motion, thus reducing the orbital energy. This action will tend first to circularize an elliptical orbit, and then to reduce the altitude of the orbit in an ever-decreasing spiral. The basic operation, or deployment, of the orbit-lowering device 300 includes inflating the drag envelope 110 with gas to increase the effective cross-sectional area of the space object 120 such that collisions with atmospheric molecules will impart a force opposing the orbital motion of the space object 120.

In many cases, the orbit-lowering device 300 would be used to de-orbit space objects 120 completely after they have completed their missions or become inoperative. Use of the orbit-lowering device 300 for this purpose will reduce orbital debris, thereby reducing the threat of damage to other space objects. In the case when the orbit-lowering device 300 is used to cause the space object 120 to be completely removed from orbit, then the orbit-lowering device 300 will burn up during reentry, as would most lightweight pieces of hardware entering an atmosphere at orbital speed.

In other cases, the orbit-lowering device 300 may be used to adjust the orbit of a space object 120. It may be desirable to circularize an orbit, or to reduce the orbital altitude. Either of these objectives could be accomplished by temporarily deploying the orbit-lowering device 300. After such actions have been completed, then the orbit-lowering device 300 may be released or deflated and retracted. If the orbit-lowering device 300 is simply released from the space object 120, then the orbit-lowering device 300 itself will de-orbit rapidly and will not become a source of orbital debris.

If the intent is to remove the space object 120 from orbit, then the orbit-lowering device 300 may not need any kind of jettisoning mechanism. The orbit-lowering device 300 would continue to operate until the space object encountered atmosphere with sufficient density that heating or drag forces caused the envelope 110 to fail. At this point, there would be sufficient drag on the space object 120 itself that reentry would occur within a short time.

However, if the intent is to lower the space object 120 to a lower altitude, or simply to circularize the orbit, then it may be desirable to include a means for deflating and retracting the envelope 110, or releasing or otherwise disabling the operation of the orbit-lowering device 300 once it has served its function. Additional embodiments related to these features are discussed below.

There are many ways to jettison the orbit-lowering device 300. Separation devices similar to those used to separate spacecraft from launch vehicle upper stages could be used.

Bum-wires running around the drag envelope attachment point could be heated to sever the drag envelope 100, which would then de-orbit of its own accord under the influence of atmospheric drag acting on its large area, even after losing its inflation gas. The pressure inside the drag envelope 110 could be increased such that the envelope 110 bursts, perhaps along a portion made weak intentionally.

The nominal operating environment of the orbit-lowering device 300 includes the very low density parts of any planetary atmosphere. With respect to the Earth, the nominal operating environment is within the Thermosphere and the Exosphere to an altitude of about 2000 km. At Earth the Thermosphere, at an altitude range of about 86 km to 500 km, is characterized by atmospheric pressures between $10^{-3}$ to $10^{-6}$ Pa and densities between about $10^{-10}$ and $10^{-13}$ kg/m$^3$. The Earth's Exosphere, beyond 500 km, has atmospheric pressures and densities lower than $10^{-6}$ Pa and $10^{-13}$ kg/m$^3$, respectively. For a comparison, the atmospheric pressure and density at sea level are about $10^5$ Pa and 1.2 kg/m$^3$. In these low-density regions, the atmosphere is so rarified that the Mean Free Path, or the average distance traveled by a gas molecule before colliding with another gas molecule is in the range of a few meters to a thousand kilometers.

Figure 4:
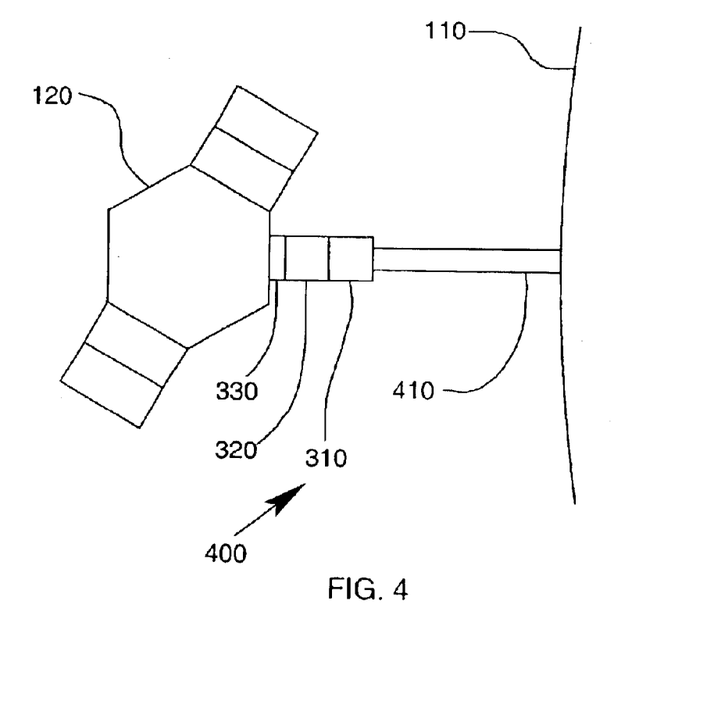
FIG. 4 shows an embodiment of the present invention where a mast is included.

Another embodiment is shown in FIG. 4. As shown in FIG. 4, an orbit-lowering device 400 includes an envelope 110, an inflation system 310, a control system 320, and attachment hardware 330. Additionally, a mast 410 provides a spatial separation between the envelope 110 and the space object 120. In some operational settings, this separation is desirable, for example, to protect the envelope from damage or similarly to protect some sensitive component of the space object 120 (e.g., a solar panel). Additionally this spatial separation may prevent entanglement or provide a larger moment arm for preventing rotation of the space object 120. The mast 410 may be extensible, or it may be rigid and of a fixed length. If the mast 410 can extend, then it may be formed as some kind of self-erecting truss-like structure. Similar masts have been used on previous space missions. Alternatively, the mast 410 may be inflatable. If it is inflatable, it is possible that the internal gas pressure required to stabilize the mast 410 would be greater than the pressure desired for inflating the drag envelope 110. In this case, the two segments could be separately sealed and inflated independently.

In a deployable system where the mast 410 is extensible, the mast 410 may be extended from an undeployed (or stowed) configuration to a deployed configuration. In this case, the control system 320 can be augmented to include a spatial-deployment control system to operate between the configurations.

Figure 5:
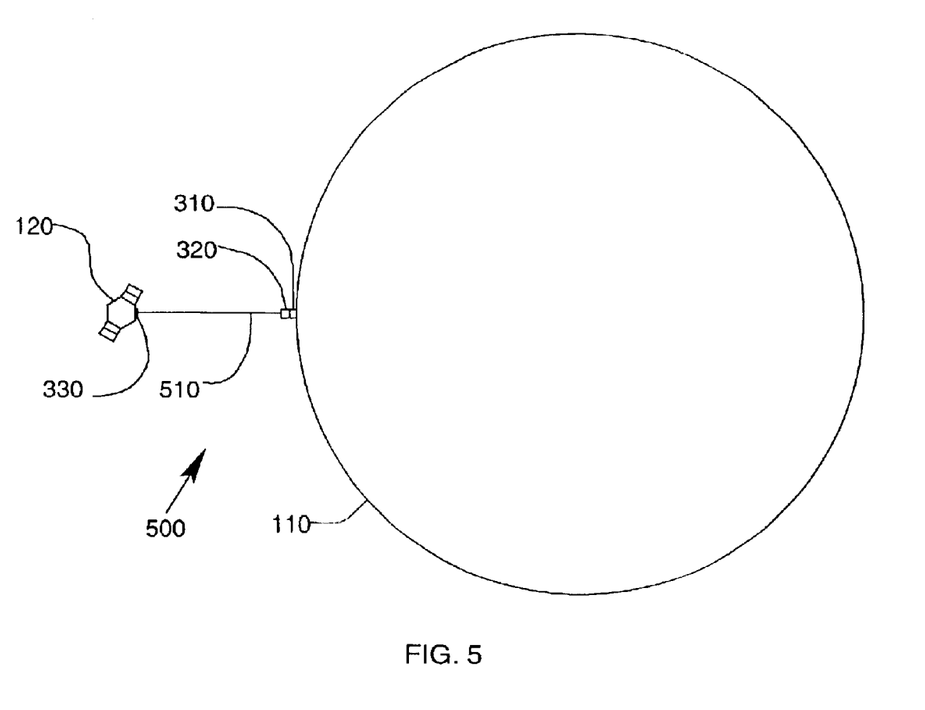
FIG. 5 shows an embodiment of the present invention where a tether is included.

Another embodiment, which also provides a spatial separation between the envelope 110 and the space object 120, is shown in FIG. 5. As shown in FIG. 5, an orbit-lowering device 500 includes an envelope 110, an inflation system 310, a control system 320, and attachment hardware 330. Additionally, a tether 510 provides a spatial separation between the envelope 110 and the space object 120. Using a tether 510 (or thin line) to provide a spatial separation may be particularly appropriate if the orbitlowering device 500 is used with a tumbling space object 120, particularly one with no well-defined spin axis. The tether 510 will still transmit to the space object the drag force acting on the drag envelope 110, thus reducing the orbit altitude. The drag on the orbit-lowering device 500 will keep the tether 510 sufficiently taut so that contact between the orbit-lowering device 500 and the space object 120 will not occur. The tether 510 may wrap around the space object 120 in a somewhat haphazard fashion, but this will not interfere with the operation of the orbit-lowering device 500. In this case, the orbit-lowering device 500 may include a spool with a sufficiently long line (as a tether 510), which could be reeled out as needed to allow continued operation of the orbit-lowering device 500 until the desired orbit lowering is achieved.

As in the previous example, the embodiment shown in FIG. 5 may be modified to include deployment (e.g., a deployed configuration, an undeployed configuration, and an augmented control system 320).

The exact connection order among the various elements in the embodiments shown in FIGS. 3-5 is not restricted to the order shown in the figures. For example, with respect to the embodiment shown in FIG. 4, the inflation system 310 could be placed at the outboard end of the mast 410 and adjacent to the drag envelope 110. Similarly, the control system 320 may also be located at the end of the mast 310. The inflation system 310 and control system 320 could also be integrated into the space object 120 rather than being attached to the outside. Furthermore, various elements of the inflation system 310 and control system 320 could be separated physically. If the inflation system 310 includes tanks for storing gas, these might be located inside the space object 120, whereas pressure regulators, control valves, check valves, lines, etc. may be located outside the space object 120, possibly inside the mast 410. Portions of the control system 320 may be included in control systems already onboard the space object 120, such as a spacecraft computer. Alternatively, the control system 320 may be completely independent of the space object 120. The control system 320 may include communications hardware. This communications hardware could provide status regarding the orbit-lowering device 400 to the space object 110 or to ground operators. The communications hardware could carry commands from the space object 110 to the orbit-lowering device 400 or directly from operators to the orbit-lowering device 400. The communications hardware could include means to communicate directly with ground-based operators completely independently of the space object 110.

Figure 6:
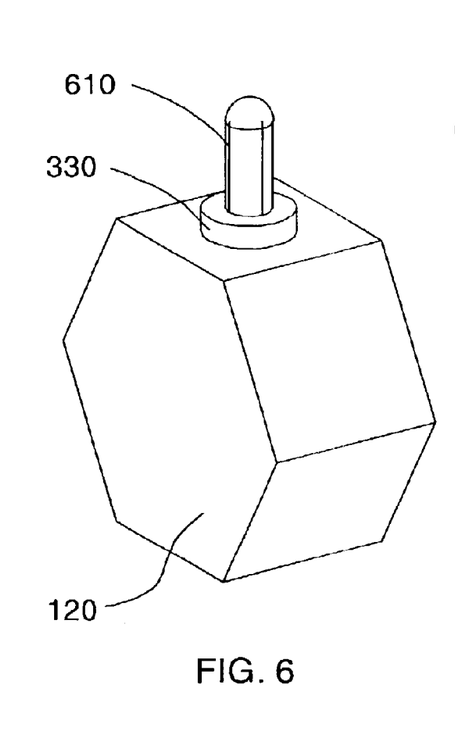
FIG. 6 shows in perspective an embodiment of the present invention where the drag envelope is contained within encapsulation hardware.

FIG. 6 shows an embodiment of the present invention for encapsulating the drag envelope 110 (e.g., as applied to the embodiment shown in FIGS. 1–3). FIG. 6 shows a space object 120 and attachment hardware 330 together with encapsulation hardware 610. The encapsulation hardware 610 contains the drag envelope 110 (e.g., as in FIG. 3) so as to protect it before inflation or other deployment. Other elements of an object-lower device (e.g., the inflation system 310 and the control system 320 of FIG. 3) can be contained in the attachment hardware 330 for convenience and protection.

The encapsulation hardware 610 may be used to restrain the drag envelope 110 until deployment is required. There are many ways of stowing the drag envelope 110 inside the encapsulation hardware 610. The drag envelope 110 may be Z-folded in a zigzag fashion, or may be arranged in a spiral, or may simply be stuffed inside the encapsulation hardware 610. Furthermore, the encapsulation hardware 610 may take many different forms. A cylindrical shell with spherical end caps shown in FIG. 6 is just one example. The encapsulation hardware 610 could be spherical. It could be formed with flat surfaces. The encapsulation hardware 610 need not be rigid. It could be a fabric sack with a laced closure. It could simply be straps to restrain the material of the drag envelope 110. It could be a frangible housing of lightweight fabric that ruptures when the drag envelope 110 is pressurized during the inflation process.

It some operational settings it may be desirable to inflate the drag envelope 110 by releasing any encapsulation hardware 610 and then introducing gas into the unconstrained drag envelope 110. There may be some benefit from controlling the deployment and inflation of the drag envelope 110 to prevent entanglement, twisting, and possible damage to the envelope 110. In this case a corresponding spatial deployment system could include some kind of reefing system or sheath along with controlled introduction of inflation gases such that the spatial arrangement of the drag envelope 110 maintains a desired geometry throughout the deployment process.

In one embodiment, the drag envelope 110 could be laid out inside a frangible tubular sleeve and stowed inside the encapsulation hardware 610. Upon release of the encapsulation hardware 610, the somewhat stiff bundle of the drag envelope 110 encased in the sleeve will tend to extend in a loosely straight line projecting away from the space object 120 as shown in FIG. 7.

Figure 7:
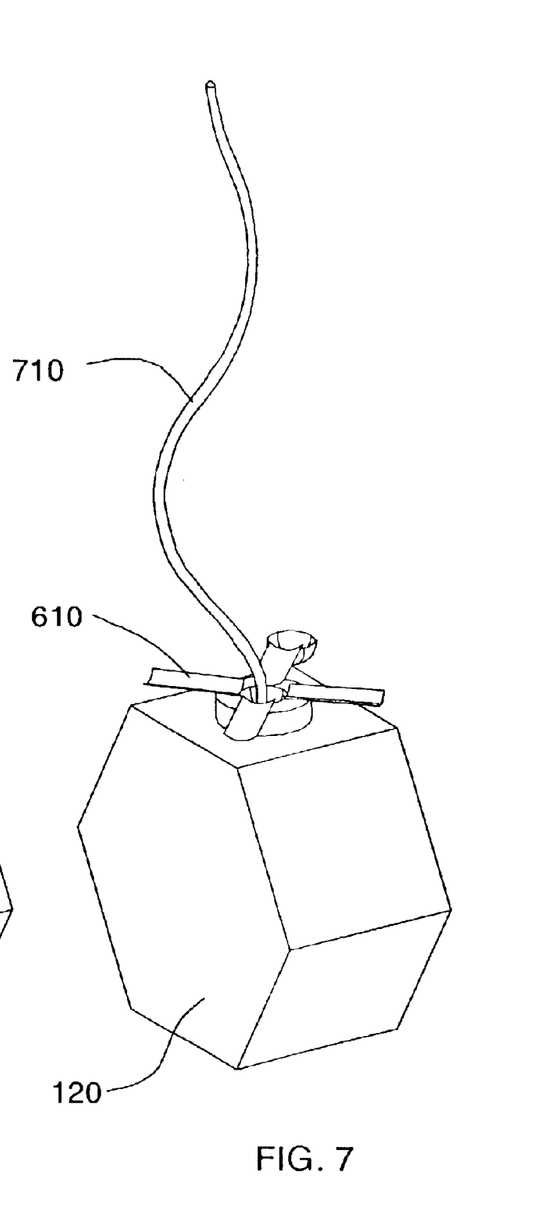
FIG. 7 shows in perspective the embodiment of FIG. 6 where the drag envelope is sheathed in a reefing sleeve and deploying from the encapsulation hardware.

FIG. 7 shows the embodiment of FIG. 6 where the encapsulation hardware 610 is opened in a petal-like configuration to release the drag envelope 110, possibly encased in a reefing sleeve 710. The petal-like deployment is shown as one example of a possible deployment scheme. During the inflation process, the tubular sleeve 710 would rupture first only in the vicinity of the base of the drag envelope 110. This way, only a small portion of the drag envelope 110 would be inflated initially. As this bubble expands, the tube would unzip and peel back, all the while containing the outboard end of the drag envelope while allowing the inboard end to inflate. Such a process is illustrated in FIGS. 8A–D.

Figures 8A, 8B:
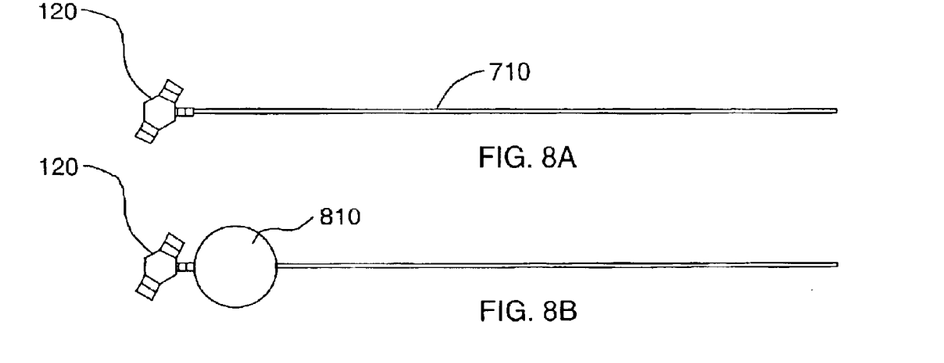
Figure 8C:
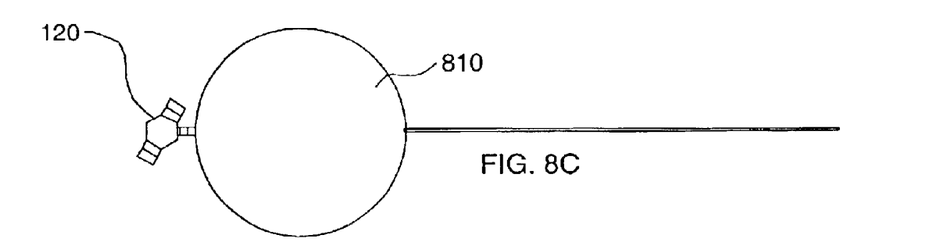
Figure 8D:
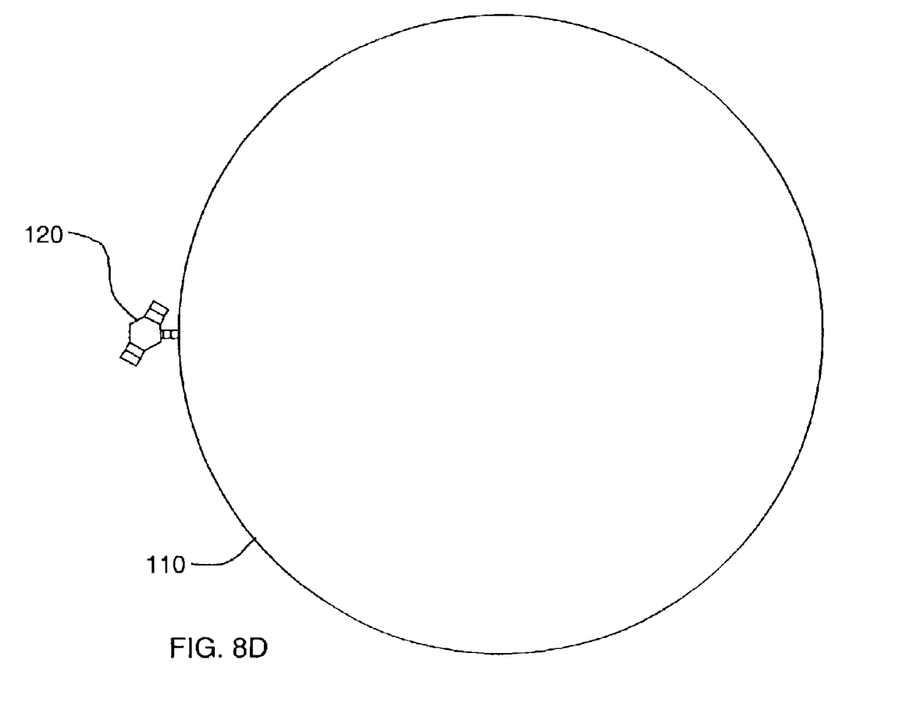

FIGS. 8A–D shows the embodiment of FIG. 6 in an inflation sequence. In FIG. 8A the space object 120 is shown with the deployed reefing sleeve 710 constraining the drag envelope 110 (not shown). FIG. 8B shows the commencement of inflation and the emergence of an inflation bubble 820 proximal to the space object 120. FIG. 8C shows the enlarged inflation bubble 820 as inflation proceed. As the inflation bubble 820 grows, the reefing sleeve 710 is successively torn or otherwise diminished. FIG. 8D shows completion of the inflation process and inflated drag envelope 110.

The reefing of the drag envelope 110 can be accomplished by a variety of means including the use of a containment sleeve comprised of frangible elements or by other means including the use of adhesive films on or within the envelope 110 to control its position with respect to the space object 120, or by a gravity-gradient-assisted envelope deployment by means of mass at the end of the envelope in order to align the deployed envelope with respect to the vertical.

Figure 9:
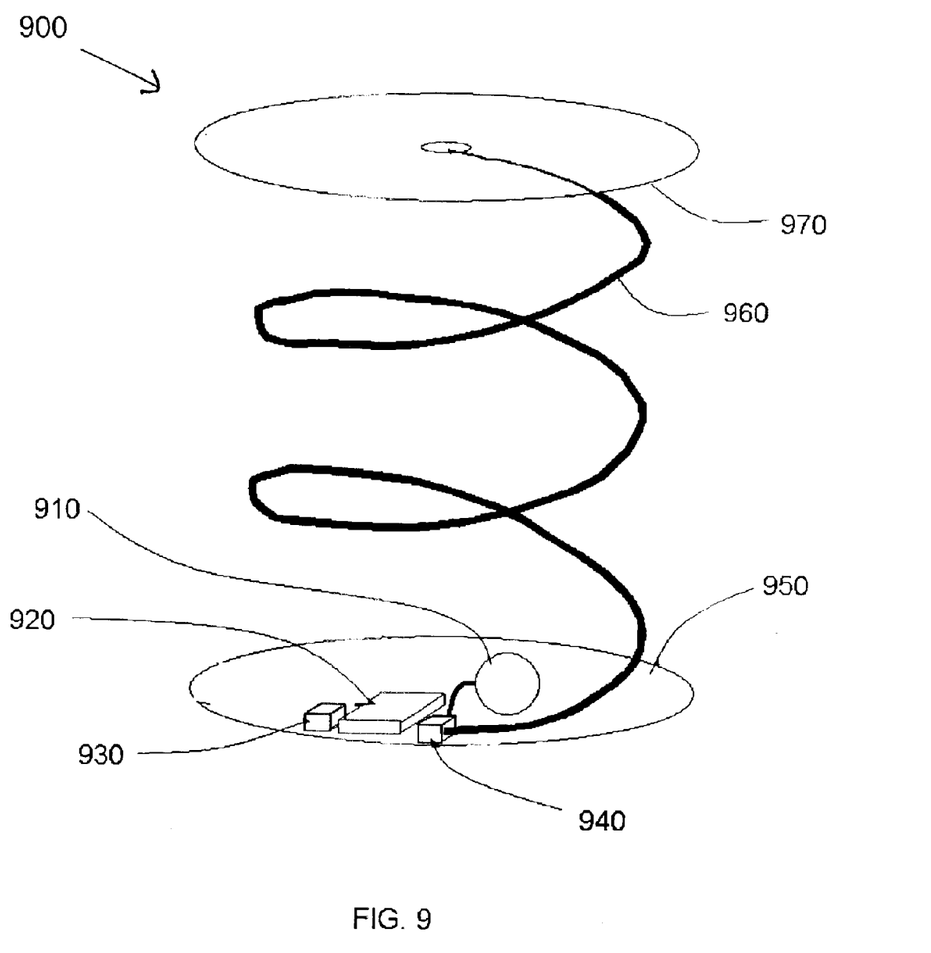
FIG. 9 shows in perspective an inflation system according to an embodiment of the present invention.
Figure 10:
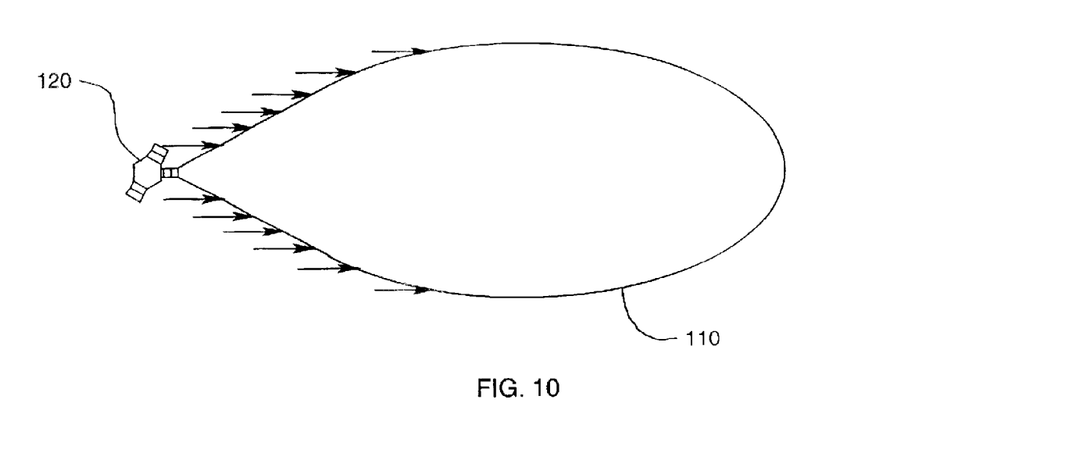
FIG. 10 shows in side view the effect of increased dynamic pressure for the embodiment shown in FIGS. 1-3.
Figure 11:
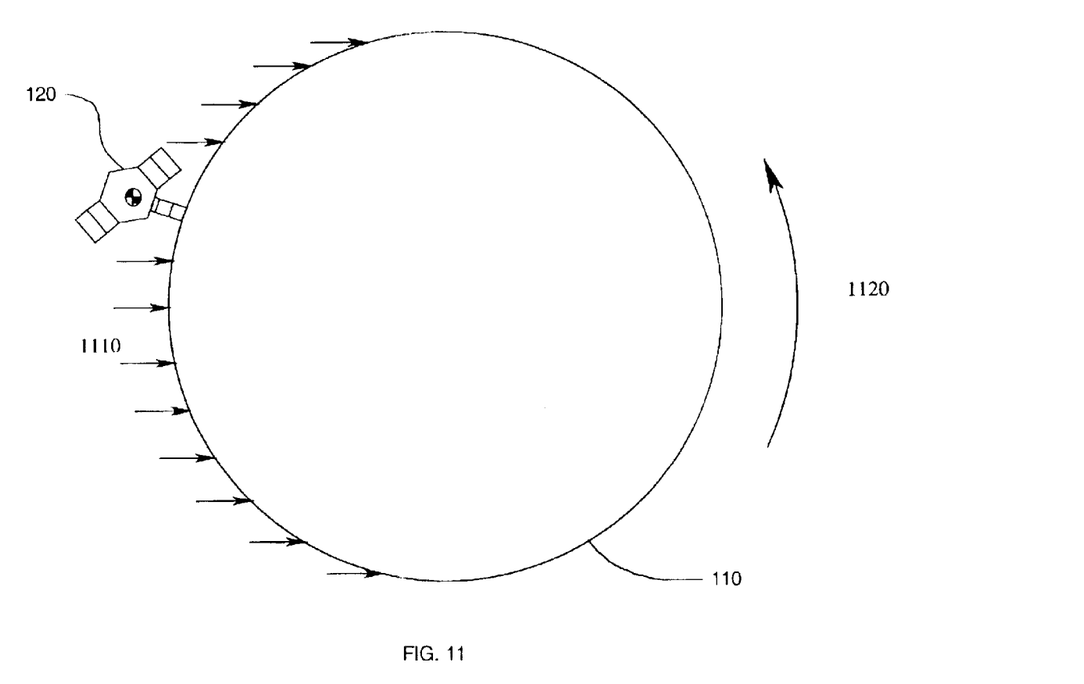
FIG. 11 illustrates in side view torque created by drag when the system is not aligned with the ram direction for the embodiment shown in FIGS. 1-3.

FIG. 9 shows an inflation system 900 according to an embodiment of the present invention (e.g., as the inflation system 310 of FIG. 3). The inflation system 900 includes a tank 910 for storing pressurized gas connected to an inflation valve 940. A flexible inflation tube 960 carries inflation gas from the tank to the drag envelope (not shown) attached to an envelope inflation connection plate 970. The inflation process is controlled by an inflation controller 920, which is powered by a battery 930.

For the embodiment shown in FIGS. 1–3, FIG. 10 illustrates the effect of increasing dynamic ram pressure acting on the drag envelope 110 when the air density is higher at lower altitudes. By increasing the inflation pressure inside the envelope 110, the initial shape as shown in FIG. 2 can be restored.

For the embodiment shown in FIGS. 1–3, FIG. 11 depicts how an imbalance in drag pressure 1110 acting on the drag envelope 110 will produce a restoring torque 1120 about the center of mass of the system when the system is not aligned with the ram direction. (In FIG. 11, the center of mass of the system is indicated on the space object 120.) This is the mechanism by which the attitude of the space object 120 may be controlled by use of the orbit-lowering device 300.

Figure 12:
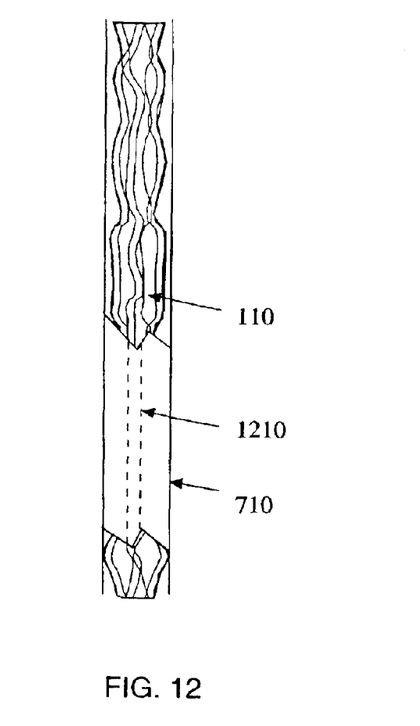
FIG. 12 shows schematically a frangible reefing sleeve according to an embodiment of the present invention.

FIG. 12 shows a frangible reefing sleeve 710 according to an embodiment of the present invention (e.g. as applied to the embodiment shown in FIGS. 7 and 8A-8D. The reefing sleeve 710 encases the folded and stowed drag envelope 110. A portion of the reefing sleeve 710 is intentionally weakened 1210 to facilitate its tearing or breaking during the inflation process as illustrated in FIGS. 8A–8D.

Figure 13:
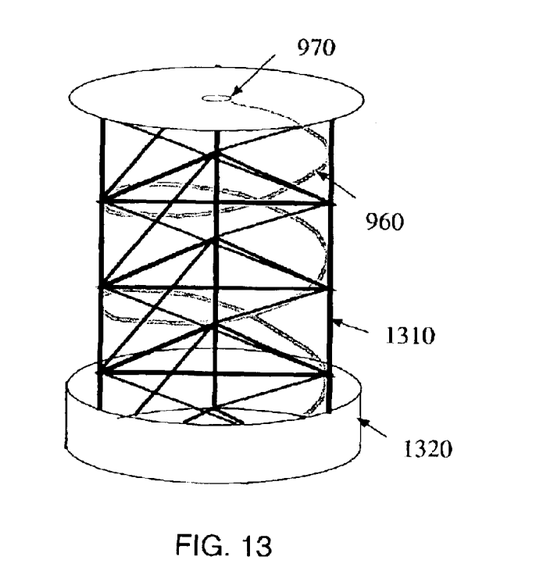
FIG. 13 shows a deployable mast according to an embodiment of the present invention.

FIG. 13 shows an extendible truss-like boom 1310 according an embodiment of the present invention (e.g., as applied to a variation of the embodiment shown in FIG. 4 where the boom 1310 replaces the mast 410). This embodiment incorporates elements of the inflation system 900 similarly as in FIG. 9 including a flexible inflation tube 960 and an envelope inflation connection plate 970. Other elements of the inflation system 900 of FIG. 9 are not shown but can be included in a mast canister 1320. The inflation tube 960 is shown spiraling up inside the boom 1310 and connecting other elements of an inflation system (e.g. as in FIG. 9) to an envelope inflation connection plate 970. The mast collapses into the mast canister 1320 in an undeployed configuration.

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An apparatus for lowering an orbit of a space object, comprising:

an envelope;

a spatial-separation element for providing a complete spatial separation between the envelope and the space object;

an inflation system for inflating the envelope;

an inflation control system for controlling the inflation system; and attachment hardware for connecting the apparatus and the space object, wherein inflating the envelope increases an effective drag area of the envelope for increasing atmospheric drag on the envelope.

2. An apparatus according to claim 1, wherein the spatial separation element includes a mast.

3. An apparatus according to claim 1, wherein the spatial separation element includes a tether.

4. An apparatus according to claim 1, wherein the inflation control system includes a timer having a reset mode.

5. An apparatus for lowering an orbit of space object, comprising:

an envelope;

an inflation system for inflating the envelope;

a spatial-deployment system for separating the apparatus and the space object in a deployed configuration, the spatial-deployment system including a reefing system that encloses a portion of the envelope before inflation and constrains the envelope during inflation;

a spatial-deployment control system for controlling the spatial-deployment system;

an inflation control system for controlling the inflation system; and attachment hardware for connecting the apparatus and the space object, wherein inflating the envelope increases an effective drag area of the envelope for increasing atmospheric drag on the envelope.

6. An apparatus according to claim 5, wherein the reefing system includes a reefing sleeve.

7. An apparatus according to claim 5, wherein the inflation control system includes a timer having a reset mode.

8. A method for lowering an orbit of a space object, comprising:

connecting an envelope to the space object;

using a spatial-separation element to provide a complete spatial separation between the envelope and the space object; and controlling an inflating of the envelope, wherein inflating the envelope increases an effective drag area of the envelope for increasing atmospheric drag on the envelope.

9. A method according to claim 8, wherein using the spatial separation element to provide the complete spatial separation includes:

connecting a first end of a mast to the envelope, and connecting a second end of the mast to the space object.

10. A method according to claim 8, wherein using the spatial separation element to provide the complete spatial separation includes:

connecting a first end of a tether to the envelope, and connecting a second end of the tether to the space object.

11. A method according to claim 8, further comprising: controlling a deployment of the complete spatial separation between the envelope and the space object.

12. A method according to claim 11, wherein controlling the deployment of the complete spatial separation between the envelope and the space object includes:

connecting a first end of a mast to the envelope, connecting a second and of the mast to the space object, and extending a length of the mast.

13. A method according to claim 11, wherein controlling the deployment of the complete spatial separation between the envelope and the space object includes connecting a first end of a tether to the envelope, connecting a second end of the tether to the space object, and extending a length of the tether.

14. A method according to claim 11, wherein controlling the inflating of the envelope includes constraining the envelope with a reefing system that encloses a portion of the envelope.

15. A method according to claim 8, wherein controlling the inflating of the envelope includes using a timer to begin the inflating of the envelope.

16. A method according to claim 15, wherein controlling the inflating of the envelope includes resetting the timer.

17. A method according to claim 8, further comprising: lowering the orbit of the space object to an altitude where a dynamic pressure is about 0.01 torr.

18. A method for lowering an orbit of a space object, comprising:

connecting an envelope to the space object;

controlling a deployment of a spatial separation between the envelope and the space object; and controlling an inflating of the envelope, wherein controlling the inflating of the envelope includes constraining the envelope with a reefing system that encloses a portion of the envelope, and inflating the envelope increases an effective drag area of the envelope for increasing atmospheric drag on the envelope.

19. A method according to claim 18, wherein controlling the deployment of the spatial separation between the envelope and the space object includes:

connecting a first end of a mast to the envelope, connecting a second end of the mast to the space object, and extending a length of the mast.

20. A method according to claim 18, wherein controlling the deployment of the spatial separation between the envelope and the space object includes connecting a first end of a tether to the envelope, connecting a second end of the tether to the space object, and extending a length of the tether.

21. A method according to claim 18, wherein controlling the inflating of the envelope includes using a timer to begin the inflating of the envelope.

22. A method according to claim 18, wherein controlling the inflating of the envelope includes resetting the timer.

23. A method according to claim 18, further comprising: lowering the orbit of the space object to an altitude where a dynamic pressure is about 0.01 torr.

24. A method according to claim 18, wherein the reefing system includes a reefing sleeve.

* * * * *